Aug. 21, 1951 R. C. SHOEMAKER 2,564,929
TRACTOR MOUNTED CRANE MAST AND BACKSTAY SYSTEM
Filed Nov. 1, 1945 5 Sheets-Sheet 1
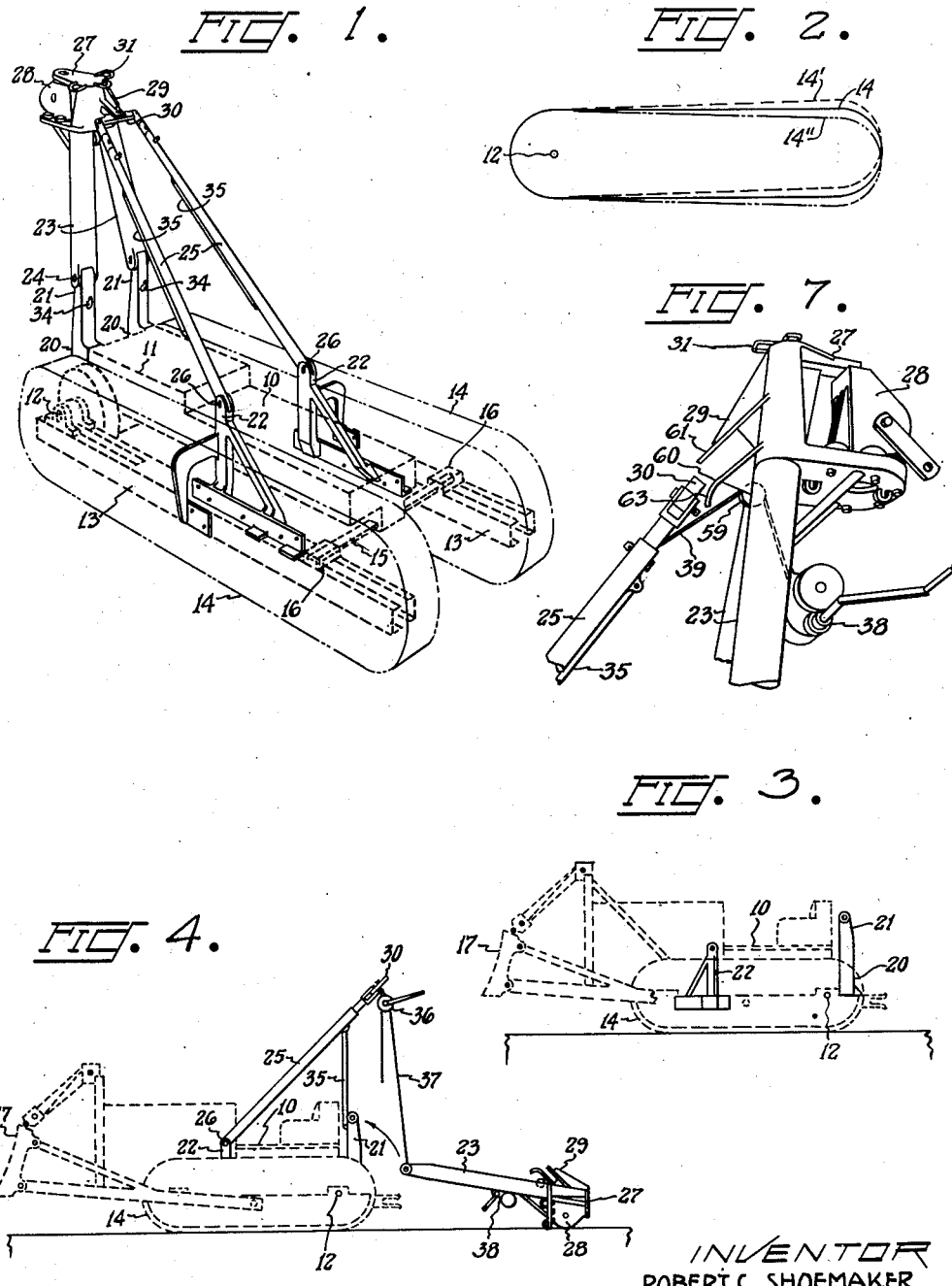
INVENTOR
ROBERT C. SHOEMAKER
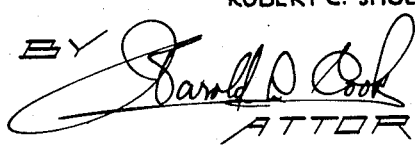
ATTORNEY Aug. 21, 1951 R. C. SHOEMAKER 2,564,929
TRACTOR MOUNTED CRANE MAST AND BACKSTAY SYSTEM
Filed Nov. 1, 1945 5 Sheets-Sheet 2
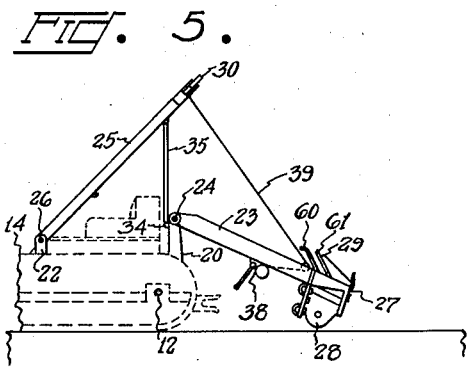
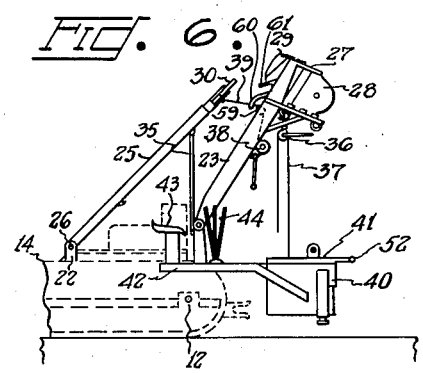
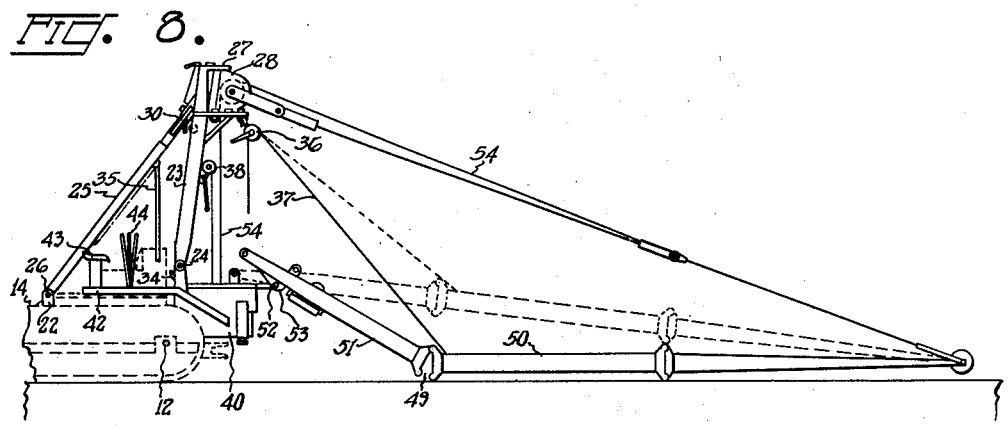
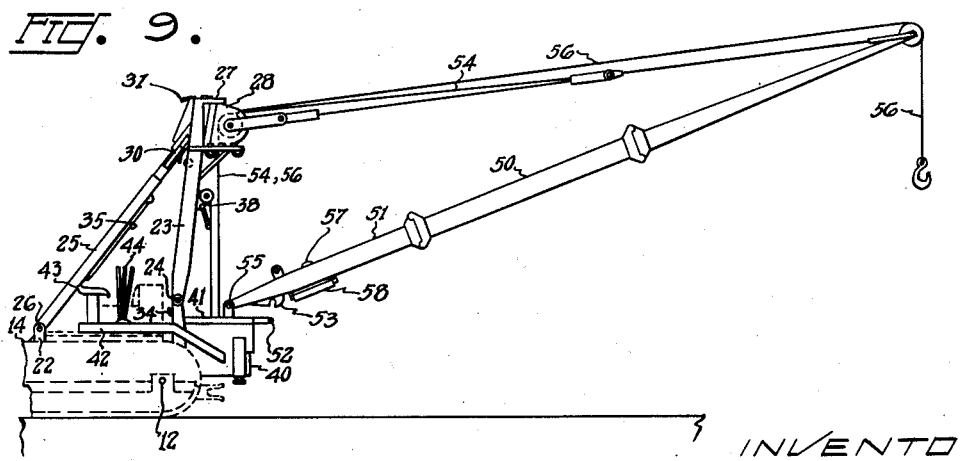
INVENTOR
ROBERT C. SHOEMAKER
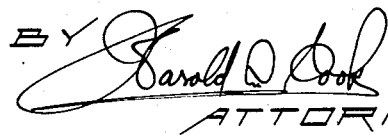
ATTORNEY

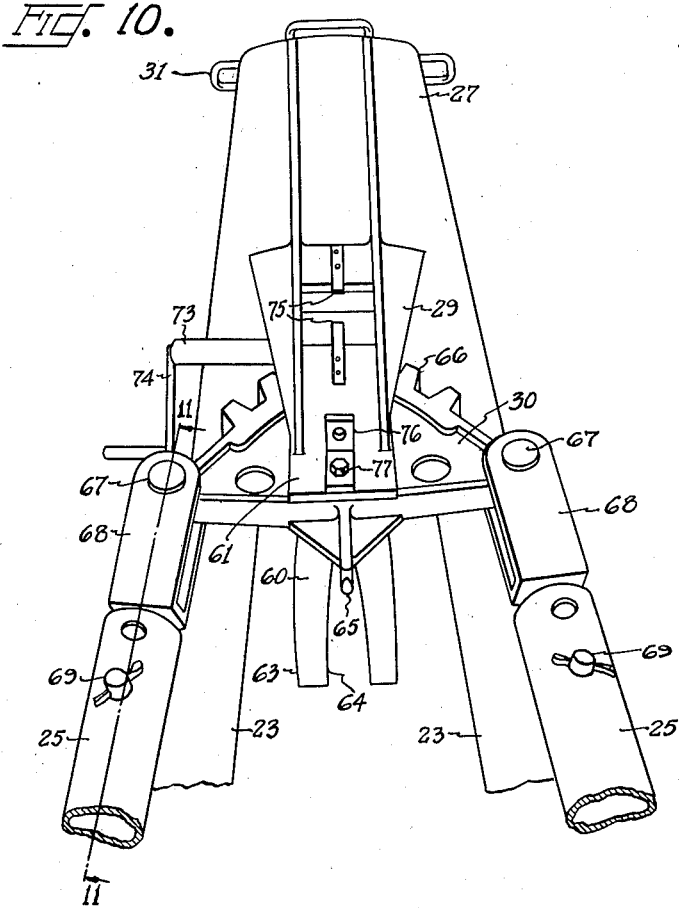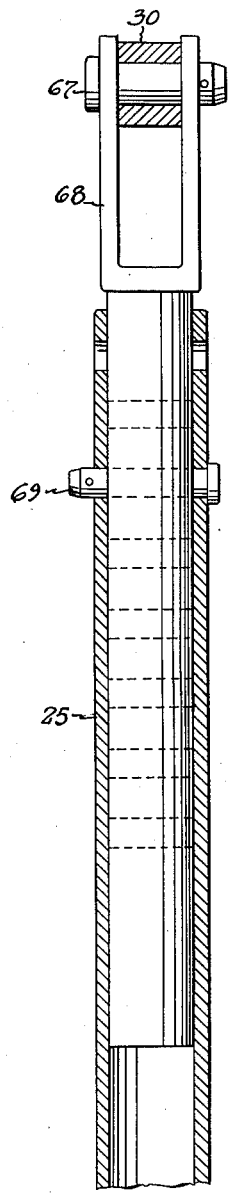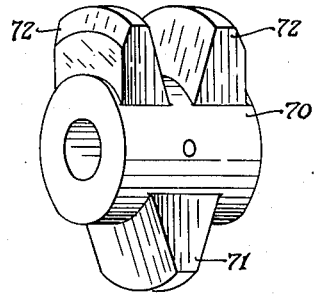

Aug. 21, 1951 R. C. SHOEMAKER 2,564,929
TRACTOR MOUNTED CRANE MAST AND BACKSTAY SYSTEM
Filed Nov. 1, 1945 5 Sheets-Sheet 4

INVENTOR
ROBERT C. SHOEMAKER
BY
ATTORNEY

Aug. 21, 1951 R. C. SHOEMAKER 2,564,929
TRACTOR MOUNTED CRANE MAST AND BACKSTAY SYSTEM
Filed Nov. 1, 1945 5 Sheets-Sheet 5
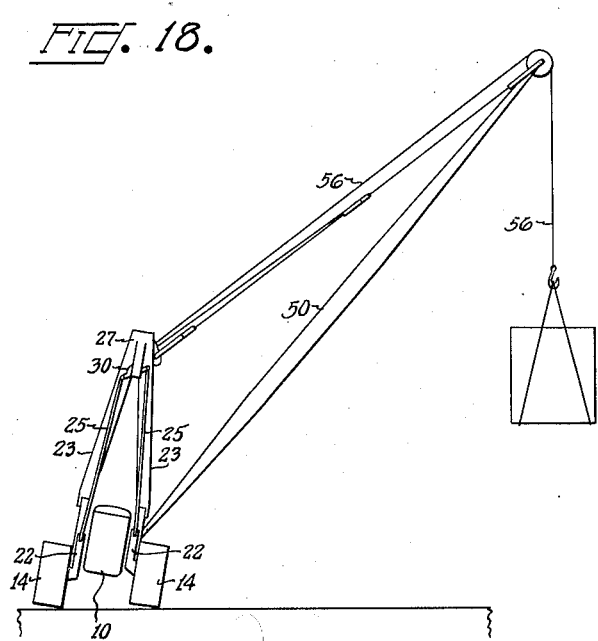
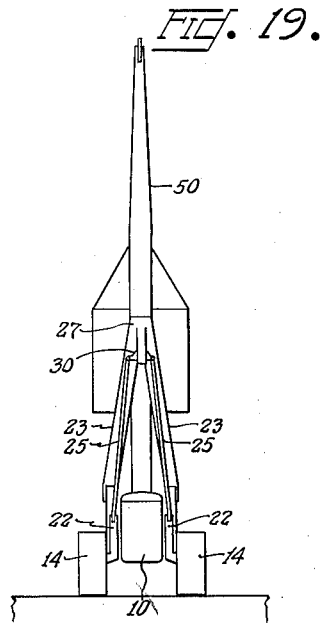
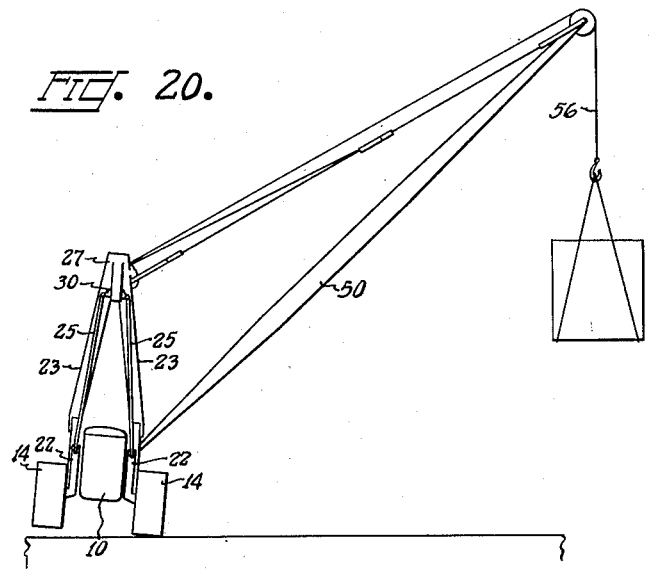
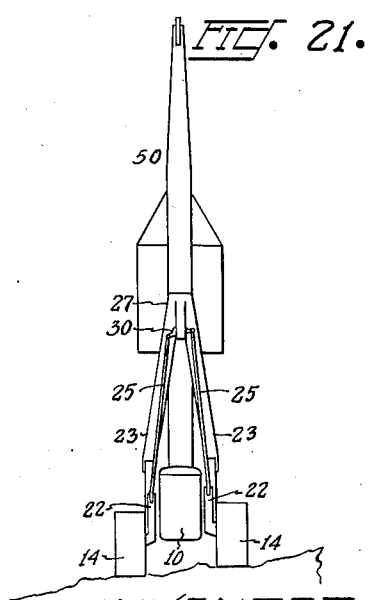
INVENTOR
ROBERT C. SHOEMAKER
ATTORNEY Patented Aug. 21, 1951

2,564,929

UNITED STATES PATENT OFFICE 2,564,929

TRACTOR MOUNTED CRANE MAST AND BACKSTAY SYSTEM

Robert C. Shoemaker, Portland, Oreg., assignor to Hyster Company, Portland, Oreg., a corporation of Oregon Application November 1, 1945, Serial No. 626,113

17 Claims. (Cl. 212—144)

This invention relates to tractor mounted cranes, and has particular reference to an improved mast and backstay system adapted for mounting on a tractor having flexible crawler traction units.

The general object of the invention is to provide an improved crane structure adapted to be mounted on a tractor of the type described as accessory equipment having advantages over conventional machinery for the same purpose and being readily removable from the tractor so as to leave the tractor unimpeded for other work.

Most power cranes, shovels and like machinery fall into one of two general classes. The first class includes the so-called full revolving cranes and shovels wherein the mast, boom winches and power plant are all mounted on a rotating platform having unlimited pivotal movement. Such cranes and shovels are built for a particular purpose and are not intended to serve as a tractor. This class of machinery is mounted on a rigid track frame carrying small tracks which cannot adapt themselves to the contour of the ground and lack adequate power to negotiate rough or muddy terrain. Frequent self-transportation of this class of conventional crane and shovel is impracticable for any but short distances as the tracks are subject to excessive wear when traveling. There is also a class of so-called three-quarter swing cranes and shovels having certain advantages over full revolving shovels, but, nevertheless, mounted on small rigid track frames lacking the power and mobility of a tractor.

The second of the two classes mentioned above comprises conventional tractor mounted cranes. For the most part, this class of equipment constitutes a permanent tractor conversion wherein a first class tractor becomes a second class crane or shovel at a total cost in excess of the cost of a full revolving shovel with crane boom attachment. Also in effecting such conversion it is the usual practice to remove or render inoperative the tractor spring and to lock the traction units into a rigid frame as in the case of the previously mentioned full revolving shovel and crane. By thus eliminating the track oscillation feature of a tractor, the resulting equipment, though having greater power than a standard crane or shovel, still lacks much of the advantage of a tractor. Conventional conversion equipment in this class also has other disadvantages in attempts to stress certain features and compromise others. Some are top heavy, some have poor visibility for the operator, and all presently known equipment in this class has the common disadvantage of so encumbering the tractor as to make repair and adjustments difficult and to make the unit practically inoperable as a tractor, without being easily removable to preserve the original functions of the tractor.

The primary objects of the present invention are to overcome the shortcomings in the above mentioned classes of equipment through the provision of a readily installable and removable crane structure for a tractor of the class described which not only leaves the tractor in its original operating condition when it is removed, but which permits the tractor to retain its inherent advantage of flexible traction units for negotiating rough terrain, even with the crane installed.

Another important object is to provide a construction which does not interfere with the bulldozer so that the latter may be retained on the tractor to prepare a path when necessary and to scrape off a reasonably level spot for crane operation, and in which the bulldozer performs the further useful function of serving as a counterweight for the crane.

Another object is to provide a sturdy and powerful crane which may be entirely erected manually without requiring extraneous equipment for erection.

Another object is to provide a construction which may be disassembled into relatively few pin connected pieces for transportation in dump trucks or other vehicles ordinarily accompanying and used with such equipment.

Another object is to provide a construction which may be carried almost fully assembled on the tractor on an ordinary low bed trailer with the mast in a lowered position to pass legal road height limits.

Another object is to provide a construction which requires no changes in the tractor for mounting, and which, when mounted, does not interfere with the ordinary service and adjustments on the tractor.

Another object is to provide a construction in which light weight parts may be manually erected to form a structure for erecting the heavier parts.

Another object is to provide a construction having good visibility for the crane operator, and which, at the same time, does not interfere with the visibility of the tractor operator in operating the tractor with the crane mounted thereon.

Reference is made to my prior patent for Tractor Mounted Crane, No. 2,362,220, issued November 7, 1944, disclosing an embodiment having the same broad objectives as the present invention. In that embodiment there is disclosed a conventional tractor of the type having flexible crawler traction units on opposite sides of a tractor body and having a crane mast mounted on horizontal pivots on the rear of the tractor body for support by the rigid axle of the tractor. The top of the mast is backstayed by a flexible cable passing through a pulley whereby the backstay system is effective only in tension and not in compression, and cannot be locked in fixed positions relative to the pulley and mast.

A more particular object of the present invention is to provide an improved backstay system having the flexibility of the cable backstay just referred to in my prior patent, and, at the same time, having means for locking the backstay system into a rigid structure including the mast, track frames, and backstay struts.

A further object is to provide a novel locking means for a backstay system of the type described which is effective in different adjusted positions of the parts to compensate for uneven ground surfaces under the traction units.

A further object is to provide a backstay system comprising rigid struts which are effective in compression as well as tension so as to allow an increased angle of swing for the boom.

A further object is to provide means for adjusting the length of the backstay struts so as to bring the masthead fair-lead vertically above the center of rotation of the boom.

Other objects and advantages reside in the particular construction and arrangement of parts shown in the accompanying drawings and described in the specification. Various changes will occur to those skilled in the art, and all such modifications are included in the invention. The present embodiment is illustrated by way of example only and not by way of limitation, the invention being limited only by the scope of the appended claims.

In the drawings:

Figure 1 is a perspective view of my novel crane mast and backstay system shown in full lines and mounted on a tractor frame and crawler traction units shown in phantom;

Figure 2 is a diagrammatic view in side elevation showing the character of the flexible mounting of the crawler traction units on the tractor shown in Figure 1;

Figure 3 is a phantom view in side elevation of a tractor showing in full lines mounting and anchor brackets for the present crane which may remain semi-permanently attached to the tractor after the removal of the crane parts;

Figure 4 illustrates a step in the erection of the crane on the brackets shown in Figure 3;

Figure 5 illustrates an erection step subsequent to Figure 4, showing the crane mast in position to be raised on its heel pins;

Figure 6 illustrates the next erection step in which the partially raised mast is used to lift the hoist unit into position for mounting on the tractor;

Figure 7 is an enlarged fragmentary view showing how the mast is finally raised into position for connection with the backstay system;

Figure 8 illustrates one manner of erecting the boom after the mast and backstay system and the hoist unit are secured in place;

Figure 9 illustrates the crane completely assembled on the tractor;

Figure 10 is a rear elevation view of the masthead, showing the positions of adjustable elements in the backstay system when the tractor is resting on level ground;

Figure 11 is a sectional view through one of the backstay struts, taken on the line 11—11 of Figure 10;

Figure 12 is a perspective view of the dog for engaging the equalizer beam to lock the backstay system in different adjusted positions;

Figure 18 is a front elevation view of a tractor with the present crane mounted thereon, showing the relative movements of the crawler traction units and the backstay struts when the crane is loaded with the backstay system unlocked;

Figure 19 is a view similar to Figure 18, showing the parts in their normal position with the crane boom swung into alignment with the center line of the tractor;

Figure 20 illustrates how the crane and tractor constitute a rigid unit when the backstay system is properly locked for crane operation; and Figure 21 illustrates how the backstay system may be locked in a different adjusted position to accommodate for uneven ground under the tractor.

Figure 13:
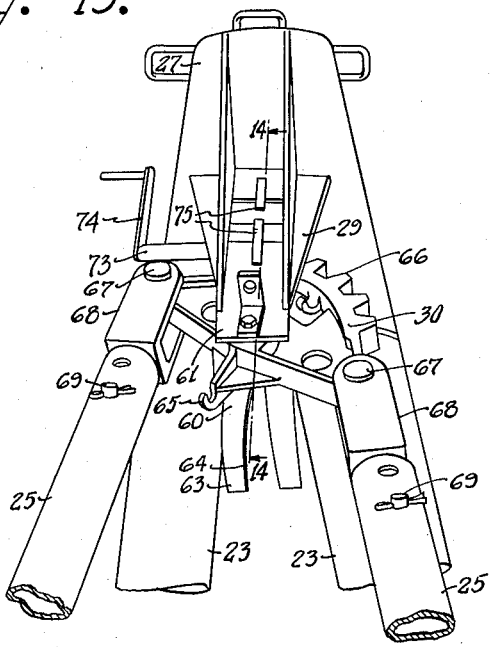
Figure 13 is a view similar to Figure 10, showing the position of parts in the backstay system in making adjustment for uneven ground under the tractor.

The present invention is particularly adapted for use on tractors having certain constructional features illustrated in phantom in Figure 1. The numeral 10 designates a tractor body in which the engine, controls and driver's seat have been omitted to better illustrate the application of the invention. The numeral 11 indicates the tractor transmission through which the power of the engine is transmitted to a driving axle 12. The ends of the axle 12 are mounted in bearings at the rear ends of a pair of traction unit frames 13 which carry crawler traction units 14 in driving engagement with sprockets on the axle. The rear end of the body 10 is thereby rigidly supported on the axle 12, and the front end of the body is flexibly supported on a leaf spring 15 having its ends secured in mounts 16 on the traction unit frames. This type of suspension provides an unsprung pivotal mounting for the rear end of the tractor body and a spring mounting for the front end of the body to permit independent up and down oscillatory movements of the two traction unit frames 13 at their front ends in traversing an uneven ground surface.

The character of this flexible mounting of the two crawler traction units is illustrated in Figure 2, showing in solid lines the driving axle 12 and the normal position of the traction units 14. In traversing uneven ground the two traction units can pivot independently to a certain extent about the axle 12, so that one traction unit may rise at its front end to a position such as indicated by the broken line 14', while the traction unit on the other side may drop at its front end to the position indicated by the phantom line 14". By virtue of the flexible mounting, such ground unevenness does not cause the tractor body to lean until the axle 12 itself passes over the uneven surface. The relative movements indicated in Figure 2 permit the traction units to maintain a good tractive contact on very uneven ground so as to effectively utilize the full power of the tractor engine for locomotion to exert a strong drawbar pull.

Although a flexible suspension of the type described is very desirable for tractor work, it is undesirable as a crane base by the very reason of its flexibility. Cranes and other machinery in the same class require a rigid inflexible foundation in order to operate successfully. The objects of the present invention are accomplished through the provision of a novel crane mast and backstay system having means by which the system may be locked into a rigid structural unit for crane operation and then unlocked to utilize to the fullest extent the spring action of the tractor suspension while moving from place to place even with the crane installed on the tractor.

The entire crane structure in the present invention is made to be removable from the tractor, leaving only a rear mounting bracket 20 with upstanding arms 21 and a pair of anchor brackets 22 left semi-permanently attached to the tractor. The mounting bracket 20 is preferably formed in either one or two parts bolted to the rear end of the frame or body 10 just behind the axle 12. Each of the anchor brackets 22 is attached to one of the traction unit frames 13 at a point remote from the axle 12 and adjacent the spring mounting 16. The brackets 20 and 22 in no way interfere with the operation of the tractor and may be left attached thereto indefinitely without inconvenience in tractor work.

The present mast and backstay system comprises essentially an A-frame mast 23 pivotally mounted on heel pins 24 on the upper ends of the bracket arms 21, and a pair of rigid backstay struts 25 pivotally connected with the anchor brackets 22 by pins 26. The upper end of the mast carries a masthead 27 having a fair-lead 28 for handling a plurality of lines and an anchor and guide member 29 for receiving an equalizer beam 30. The two backstay struts 25 are attached to the ends of the beam 30 to maintain the mast in adjusted position independent of the tractor spring 15. Various features of this construction will be described in connection with the several detail views in the drawings.

Erection of the crane structure will now be described with particular reference to Figures 3 to 9. Figure 3 illustrates a tractor of the type shown in Figure 1, equipped with a conventional bulldozer blade 17 and having the brackets 20 and 22 mounted thereon while the bulldozer is being used. The first step in erecting the crane is to insert the pins 26 connecting the lower ends of the struts 25 with the brackets 22 and to connect the equalizer beam 30 between the upper ends of the struts. Then the backstay struts may be manually raised and a pair of props 35 which are pivotally connected thereto may be seated on lugs 34 on the bracket arms 21 to support the struts as a temporary fixed boom as shown in Figure 4. With the aid of this temporary boom arrangement and auxiliary equipment on the crane structure, the heavier parts may be erected one by one until the crane is fully assembled without the aid of extraneous equipment. A chain hoist or the like 36 having a chain 37 is next hung from the equalizer beam 30 to lift the heel ends of the mast 23 into position on the arms 21 for insertion of the heel pins 24. When the heel pins 24 are in place the mast may be raised by a hand winch 38 on the mast itself having a line 39 attached to the equalizer beam as shown in Figure 5.

When the mast is raised by the winch 38 to about the position shown in Figure 6, it is left at this angle temporarily by locking the winch, and the chain hoist 36 is attached to a hook or eye provided in the masthead. The chain 37 may then be used to lift the hoist unit 40 into position for attachment to the mounting bracket 20. In the present embodiment the hoist unit 40 carries with it a revolving bull wheel 41 and a platform 42 having a crane operator's seat 43 and crane controls 44 arranged to be positioned above one of the traction units of the tractor. After the hoist unit is secured to the mounting bracket the mast may be raised further by the hand winch 38 so that the equalizer beam 30 may be connected with the anchor and guide member 29 on the masthead 27. When this connection is accomplished the mast and backstay system are fully erected as shown in Figure 1 and, in addition, the hoist unit is mounted in position to receive the boom. It is to be understood that the mast may be erected without the hoist unit, but when the hoist unit is initially installed it is most easily raised into registry with the mounting bracket in the manner shown in Figure 6 before the mast is fully erected. Instead of a hoist unit for crane work, other heavy equipment such as a pump, compressor, post hole digger or the like, may be installed on the mounting bracket 20 in the manner shown in Figure 6, utilizing the mast for lifting the equipment into place. A power take-off gear (not shown) is associated with the mounting bracket 20 on the back of the tractor for driving any such equipment that may be mounted thereon.

One method of erecting the boom after the mast and hoist unit have been erected is illustrated in Figure 8. Assuming the boom 50 to be lying on the ground, connecting pins are removed from the under side of the joint 49 at the upper end of the heel section 51 so that this section is then free to pivot at the joint. Again utilizing the chain hoist 36, the chain 37 is first attached to the heel end of the section 51 to elevate it so that the tractor may be backed thereunder into the position shown in Figure 8. The bull wheel 41 is provided with an auxiliary pivot 52 adapted to be engaged by a pair of ears 53 in the manner illustrated when the boom heel section is in this position. The chain 37 is then removed from the heel end of the boom section 51 and attached to the boom as shown in Figure 8 to raise the mid section of the boom into position for reinserting the pins in the hinged joint to make the boom rigid again. The boom suspension cable 54 is then rigged so that the end of the boom may be raised to rock the boom on the auxiliary pivot 52 until the boom heel pins 55 can be inserted. Figure 9 shows the crane fully assembled and rigged for hoisting work, the hoist line 56 passing through the masthead fair-lead 28 and thence vertically down through the center of the bull wheel 41 to a sheave or winch in the hoist unit 40.

The crane may also be rigged for dragline scraper operations utilizing the sheave 57 and fair-lead rollers 58 in the boom heel section 51. The present invention, however, is not concerned with the rigging for different operations.

It is to be noted, however, that the construction of the crane, regardless of whether it is rigged for hoisting or scraper work, is such that the bull wheel 41 and the tractor body are subjected only to the boom end thrust and not the overturning forces. The overturning forces acting on the system are transmitted entirely to the crawler traction frames from the masthead 27 which is adjusted so that the lines extending from the fair-lead 28 to the hoist unit 40 are disposed as nearly as possible in a vertical line or plane. It will be observed that the true axis of rotation of the boom is not the axis of the bull wheel 41, but an imaginary line connecting the center of rotation of the bull wheel with the center of rotation of the fair-lead 28. The important features of the present invention comprise means for adjusting the position of the masthead 27 to bring the center of rotation of the fair-lead 28 as nearly as possible vertically above the center of rotation of the bull wheel. When this condition is accomplished the boom in reality swings about a vertical axis even though the axis of the bull wheel may tilt fore or aft because of sloping ground under the tractor. When the cables between the fair-lead 28 and the hoist unit are vertical, the boom will be stable in any position and will not tend to swing by gravity to one side as it would if the boom were supported from a mast structure mounted on the bull wheel.

The present backstay system provides adjustable locking means for holding the masthead vertically above the center of the bull wheel, even though the tractor be resting upon sloping ground, and also includes equalizer means for holding the masthead in the desired position when the traction units 14 are in different relative positions on uneven ground. Since the mast is backstayed to the traction unit frames 13, the principal overturning stresses are applied directly thereto without appreciably loading the tractor spring 15. Although the mast supporting arms 21 are attached to the tractor body, their position is so close to the rigid axle 12 that the effect is practically the same as though they were mounted directly on the traction unit frames. The boom thrust in the heel pins 55 has a short lever arm with respect to the axle 12, which has the effect of producing a small negative load on the spring 15 which thereby provides a limited resilience in the system. Any action of the spring 15 produces slight relative movements of the mast and backstay struts on their pin connections 24 and 26, but such movements in no way detract from the inherent rigidity and stability of the backstay system as long as the traction units are locked to fit the ground surface.

The independent action of the spring 15 is particularly important in moving the crane over rough ground or in performing tractor work with the boom and hoist units removed but with the mast and backstay system still mounted on the tractor. On such occasions the backstay system may be unlocked to provide a jointed system permitting independent oscillation of the traction units to obtain the full advantages of the exceptional mobility of this type of tractor. It will be seen as the description proceeds in connection with additional details of construction illustrated in the drawings that when the backstay system is locked independent oscillation of the traction units is prevented, although the spring 15 is still effective to provide resilient suspension for the front end of the tractor body, and that when the backstay system is unlocked the original flexibility of the tractor is completely restored and its movements are inhibited in no way by the crane structure.

Figure 7 illustrates an erection step following in sequence after Figure 6, and shows the manner of bringing the backstay assembly into registry with the masthead for connection therewith. After the hoist unit 40 has been mounted in the manner shown in Figure 6, the chain 37 is removed therefrom and the cable 39 is shortened by the hand winch 38 to cause the masthead 27 and equalizer beam 30 to approach each other. The cable 39 is trained over a small sheave or pulley 59 in the lower part of the masthead, so that by the time the parts assume the positions shown in Figure 7 the mast has raised the sheave 59 to a higher level than the point of attachment of the end of cable 39 on the equalizer beam 30. This causes the struts 25 to lift their props 35 off the supporting lugs 34 so as to be supported entirely by the cable 39. As the masthead and equalizer beam thus approach each other, the equalizer beam engages and slides upwardly on a curved guide plate or track 60 until it is contained between this guide plate and an upper plate 61 parallel therewith. The plates 60 and 61 are inclined at the angle of the backstay struts after assembly, and are provided with aligned holes for receiving a bolt or pin 62 (Figure 14) through the equalizer beam 30. Figure 10 is a rear elevation view showing the parts in assembled relation. The lower end of the guide plate 60 is curved downwardly and provided with a guide slot 64 for receiving the cable 39 to guide the equalizer beam 30 into proper position to receive the pin 62, the cable being preferably attached to a hook 65 appearing in Figure 10. One side of the equalizer beam is of arcuate shape and provided with a number of teeth 66 in the nature of gear teeth, for which locking means are provided in a manner presently to be described. The ends of the equalizer beam carry pin connectors 67 for adjustable ends 68 on the backstay struts 25.

The ends 68 are secured in the tubular struts 25 by means of pins 69 which may be placed in different holes to give the desired over-all length. When the tractor is parked on a slope facing either uphill or downhill, it is necessary either to shorten or lengthen both the backstay struts 25 the same amount in order to bring the center of rotation of the fair-lead 28 vertically above the center of the bull wheel 41. This is done by moving the pins 69 in both struts to new positions, to produce the necessary length adjustment.

Figure 16:
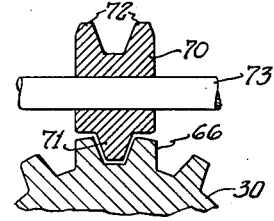
Figure 16 is a detail view in section, showing one locking position of the dog in engagement with the equalizer beam.
Figure 17:
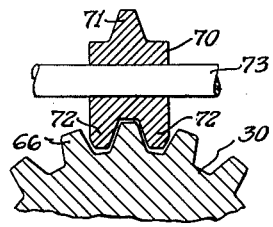
Figure 17 shows the other locking position of the dog to obtain a slightly different adjustment of the equalizer beam.
Figure 14:
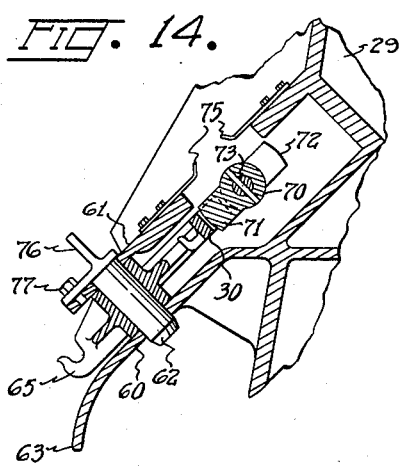
Figure 14 is a sectional view on the line 14—14 of Figure 13, showing the locking dog in engagement with the equalizer beam of the backstay system.
Figure 15:
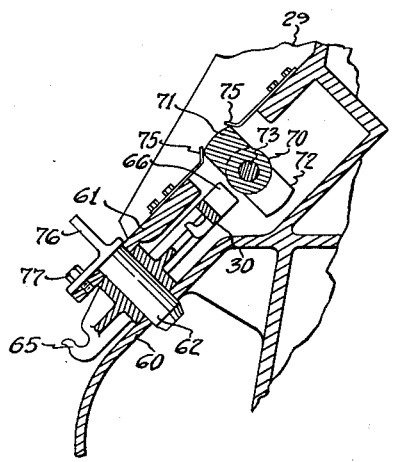
Figure 15 is a view similar to Figure 14, but showing the dog rotated to unlocked position.

Sometimes, however, it may be necessary to operate the crane with the tractor parked so that one traction unit is higher than the other at the front end of the tractor. An adjustable locking means is provided for such situations, which has the effect of shortening one strut 25 and lengthing the other. This adjustable locking means comprises the dog 70 shown in Figure 12, one side of the dog having a single lug 71 adapted to fit between two of the teeth 66, and the other side of the dog having a pair of lugs 72 shaped and spaced to interengage with the teeth in a slightly different position of the beam. The dog 70 is mounted on a short shaft 73 journaled in the masthead and provided with a crank handle 74, so that the shaft may be rotated to provide two locking positions and two unlocking positions of the dog. Figure 16 illustrates one locked position in which the single lug 71 is engaged between a pair of teeth 66 on the equalizer beam 30 to lock it against rotation. The lug 71 may thus be brought into engagement between any pair of teeth 66 on the equalizer beam to lock it in a number of different adjusted positions. If the desired position of the equalizer beam brings a tooth instead of a space opposite the lug 71, the dog may be turned over 180 degrees, to engage the teeth as shown in Figure 17. The dog may be manipulated in this way to provide locking intervals equal to one-half the pitch distance between the teeth 66 which constitutes as fine adjustment as is ordinarily required on a structure of this kind. Inasmuch as the dog 70 performs only a locking function and not a driving function, a continuous thread or spiral is not necessary and would be undesirable because it could not readily be unlocked. As shown in Figures 14 and 15, a 90 degree turn of the crank handle from either of the two locked positions shown in Figures 16 and 17 will unlock the backstay system for free pivotal movement of the equalizer beam on its pin 62. The dog may be frictionally retained in unlocked position by a pair of spring members 75. Figures 14 and 15 also show how the pin 62 is retained against casual displacement by a keeper 76 pivotally attached to the plate 61 by means of a bolt or screw 77.

In driving the tractor, the dog 70 must be unlocked as shown in Figure 15 to permit free individual oscillation of the traction units about their common axle 12. As the crawler units rise and fall at their front ends in passing over rough ground, as shown in Figure 2, the backstay struts 25 will play back and forth, causing oscillation of the equalizer beam 30 around its pin 62.

If the crane were used for a side lift with the equalizer beam unlocked, the situation shown in Figure 18 would result. This is a view of the front of the tractor and the rear of the crane, showing the relative positions of the front ends of the crawler traction units and the resulting angular position of the equalizer beam 30. The axle 12 on the remote end of the tractor has tilted to raise one of the traction units off the ground at that point, causing the traction unit on the high side to assume the relative position indicated at 14" in Figure 2, while the traction unit on the low side assumes the position indicated at 14'. If the load were swung straight to the rear of the tractor as shown in Fig. 19, the crawler traction units would come back to normal position, as shown by the solid line 14 in Figure 2, to level the equalizer beam. If the equalizer beam were then locked in the position of Figure 19 and the load again swung to the side, it would be observed, as shown in Figure 20, that the traction units had lost their flexibility so that if the load were sufficiently heavy the tractor would tip as a rigid unit with both traction units firmly locked together. With the traction units thus locked, a solid base is provided for crane operation having maximum stability against overturning. Figure 20 illustrates how the locking of the equalizer beam is effective to convert a flexible jointed system, capable of distortion as shown in Figure 18, into a rigid system which cannot be distorted but which must be overturned as a unit.

Figure 21 illustrates how the rigidity shown in Figure 20 can be achieved even though the tractor is resting on uneven ground. In this case the axle 12 is positioned over a reasonably level spot, but the front ends of the crawler traction units are not resting on the same level, the units occupying relative positions such as indicated at 14' and 14" in Figure 2. As long as the axle 12 is horizontal the mast 23 will not lean sideways, but, obviously, the equalizer beam cannot be locked in a central position with one traction unit lower than the other at the front end of the tractor. By driving the tractor onto such a spot with the equalizer beam unlocked, and then locking it in whatever position it assumes, the entire backstay system including the mast and crawler traction units will be locked into a rigid system which fits the ground on which it is placed. This is the desired condition to be accomplished, and crane operations may be carried out just as in Figure 20. If the dog 70 does not readily fall into locking position when the tractor is parked for crane operation, the boom may be swung to one side or the other to produce a slight amount of relative movement between the two traction units to rotate the equalizer beam into the nearest locking position.

The bulldozer is omitted in Figures 18 to 21 in order to show the relative positions of the two traction units, but it is understood that it is preferred to have the bulldozer on the tractor to serve as a counterweight for crane operation. In lieu of the bulldozer, brackets may be provided on the traction unit frames 13 for holding a plurality of removable weights in the manner disclosed in my prior patent. The weight of a conventional bulldozer is sufficient to impart stability to the crane for a greater lift when the boom is swung to the rear than when it is swung to the side, thereby making the lateral position critical in determining the maximum load which may be lifted at a given distance from the center of boom rotation. The lifting capacity with the boom to the rear is still further improved by backing the tractor tracks partially upon a timber to extend the ground bearing rearwardly of the axle. By externally guying the masthead, unusually heavy loads may be lifted and swung to either side or rear positions without overturning the tractor, and masthead eyes 31 are provided for this purpose to utilize the reserve power of the tractor engine.

The bulldozer is also of great advantage in accompanying with the crane for preparing the way for trucks and other vehicles used in conjunction with the crane, and for preparing a reasonably level spot on which to stand the tractor for crane operation. Thus it is seen that neither the crane nor the bulldozer impedes the operation of the other, and, on the contrary, the presence of the overhung ponderous counterbalancing weight of the massive bulldozer is of material assistance in crane operations.

The tractor may be operated satisfactorily with the mast and backstay system assembled as shown in Figure 1, for tractor uses where complete dismantling is not necessary.

When it is desired to remove the mast and backstay system, the sequence of erecting steps shown in Figures 3 to 7 may be reversed. Thus, by hooking one end of the cable 39 from the hand winch 38 on the hook 55 and removing the pin 62, line may slowly be payed out to lower the mast and the backstay struts so that the latter eventually will come to rest with their props 35 supported on the lugs 34 to serve as a temporary boom for further lowering the mast as shown in Figure 5. After the mast is removed as shown in Figures 5 and 4, the backstay struts and equalizer beam may be handled manually, leaving only the brackets 20 and 22 on the tractor. These brackets do not encumber the tractor in any way and may be left permanently in place.

Thus the present crane structure constitutes a temporary conversion for a tractor which may either be partially or wholly dismantled in the field to put the tractor back either in the condition shown in Figure 1 or Figure 3. The advantages of tractor mobility are retained with the crane fully assembled thereon, but when crane operation is commenced the tractor and crane are quickly locked into an inflexible structure having a rigid base comparable with single purpose cranes and shovels.

Having now described my invention and in what manner the same may be used, what I claim as new and desire to protect by Letters Patent is:

1. In a tractor vehicle having a pair of crawler traction units interconnected at one end of the vehicle by a rigid axle beam and at the other end of the vehicle by a resilient suspension and having a tractor body mounted on said axle and resilient suspension; a mast pivotally mounted on said body adjacent said axle, an articulated backstay system of rigid members connecting the upper end of said mast and said traction units at points remote from said axle to accommodate relative movements of the traction units, and means for locking said backstay system rigidly in a fixed position without interfering with the resilient suspension of said body.

2. In a tractor vehicle having a pair of crawler traction units interconnected at one end of the vehicle by a rigid axle beam and at the other end of the vehicle by a resilient suspension and having a tractor body mounted on said axle and resilient suspension; a mast mounted on said body adjacent said axle, an equalizer beam pivotally mounted on said mast, and a pair of rigid backstay struts connecting the ends of said equalizer beam with said traction units at points remote from said axle.

3. In a tractor vehicle having a pair of crawler traction units interconnected at one end of the vehicle by a rigid axle beam and at the other end of the vehicle by a resilient suspension and having a tractor body mounted on said axle and resilient suspension; a mast pivotally mounted on said body adjacent said axle, an equalizer beam pivotally mounted on said mast, a pair of rigid backstay struts connecting the ends of said equalizer beam and said traction units at points remote from said axle, and means for locking said equalizer beam in various fixed positions on said mast to provide a rigid backstay system for said mast in different positions of said traction units independent of said resilient suspension.

4. In a tractor vehicle having a pair of crawler traction units interconnected at one end of the vehicle by a rigid axle beam and at the other end of the vehicle by a resilient suspension and having a tractor body mounted on said axle and resilient suspension; a mast pivotally mounted on said body adjacent said axle, a masthead on said mast, an equalizer beam pivotally mounted on said masthead, a toothed sector on said equalizer beam, a dog on said masthead selectively engageable with said toothed sector to lock said equalizer beam in various angular positions, and a pair of rigid struts connecting the ends of said equalizer beam and said traction units at points remote from said axle.

5. In tractor mounted equipment, a mast pivotally mounted on the tractor, an articulated backstay system of rigid members for supporting said mast on said pivotal mounting, and cooperating means on said mast and backstay system to lock said system into a rigid, non-articulating structure.

6. An adjustable backstay system for a mast comprising an equalizer beam pivotally mounted on said mast, a toothed section on said equalizer beam, a movable dog on said mast selectively engageable with different parts of said toothed sector to maintain said equalizer beam in various adjusted positions on said mast, and a pair of backstay struts pivotally attached to said equalizer beam on opposite sides of said pivotal mounting.

7. In a mast construction, a mast head having a pair of spaced inclined plates one above the other, aligned openings in said plates for receiving a pin connector, the lower of said plates being extended downwardly to form a track for guiding a member to be moved into position between said plates for pin connection therewith, and a guiding slot in said track.

8. In a mast construction, a mast having a mast head, means on said masthead for anchoring a backstay system, means for supporting said backstay system in mast receiving position, a sheave on the mast for receiving a cable connected with the backstay system to erect said mast from said backstay system, and guide means on said mast head for receiving an element of said backstay system and guiding same into position for anchoring to said masthead.

9. In a mast construction, a mast pivotally mounted at its base, a pair of rigid backstay struts pivotally mounted at their bases and supported by props to form a boom adjacent said mast, and a hand winch on said mast having a cable attachment with said backstay struts for raising and lowering said mast toward and away from connection with said struts.

10. A mast construction comprising a mast pivotally mounted at its base, a pair of backstay struts pivotally mounted at their bases, an equalizer beam interconnecting the upper ends of said struts, a masthead on said mast, means for supporting said struts in position for connection of said equalizer beam with said masthead, a hand winch on said mast, and means for training a cable from said winch through said masthead for attachment to said equalizer beam for erecting said mast.

11. In a mast construction, a mast pivotally mounted at its base, a pair of rigid backstay struts pivotally mounted at their bases, an equalizer beam interconnecting the upper ends of said struts, a hand winch on said mast, a masthead on said mast, means on said masthead for establishing a pin connection with said equalizer beam, means for supporting said struts and equalizer beam in position to receive said pin connection, guide means adjacent said pin connection for guiding said beam into position for said connection when said mast is erected, and means for training a cable from said winch through said masthead for connection with said equalizer beam to erect said mast.

12. In a mast construction, a mast pivotally mounted at its base, a pair of rigid backstay struts pivotally mounted at their bases, a masthead on said mast, means for connecting said struts to said masthead to stay said mast, props on said struts to support said struts as a boom when disconnected from said masthead, means to support said props adjacent the base of the mast, and cable means attached to said boom for supporting said mast from said boom in an inclined position.

13. A mast construction for a crawler tractor having flexible traction units on opposite sides of a tractor body, comprising a pair of bracket elements on said tractor body, a mast pivotally mounted on said bracket elements, a pair of rigid backstay struts pivotally connected with said traction units remote from said mast, props on said struts for engaging said bracket elements to support said struts as a boom when the mast is not in its final erected position, and cable means connected between said boom and mast for erecting the mast.

14. In a tractor, a body, an axle at one end of said body interconnecting a pair of flexible traction units on opposite sides of said body, a resilient mounting for said traction units at the other end of said body, mounting means for a boom and hoist unit on the axle end of said body, a mast pivotally mounted on said mounting means, a pair of backstay struts connected with said traction units at the resiliently mounted ends thereof, pivotal means for connecting said struts with the top of the mast to accommodate movements of said traction units when the tractor is traveling, and means engageable with said pivotal connecting means for locking said mast, struts and traction units into a substantially rigid structure.

15. A combination tractor, bulldozer and crane comprising a tractor body, a pair of crawler traction units on opposite sides of said body mounted on an axle at the rear end of said body and on a resilient suspension at the front end of said body, a bulldozer at the front end of said body and mounted on said traction units, a crane mast mounted on said tractor at the rear end of said body, rigid backstay struts interconnecting said mast with the forward ends of said traction units, and means to lock said backstay struts, traction units and mast into a relatively rigid structure utilizing the weight of said bulldozer and traction units for crane stability without interfering with the resilient suspension of the front end of said tractor body.

16. In a tractor having a pair of flexibly mounted crawler traction units, a mast supported at its base on horizontal pivots on said tractor, a backstay system of rigid members interconnecting the head of the mast and said traction units and having articulating motion to accommodate the relative movements of said traction units when the tractor is traveling, and means to lock said backstay system and traction units into a substantially rigid and non-articulating unit with said mast.

17. An adjustable backstay system for a mast comprising an equalizer beam pivotally mounted on said mast, a pair of rigid backstays connected to the ends of said equalizer beam, and means for locking said equalizer beam in a fixed position on said mast.

ROBERT C. SHOEMAKER.

REFERENCES CITED

The following references are of record in the file of this patent:

UNITED STATES PATENTS

| Number | Name | Date |
| --- | --- | --- |
| 494,473 | Garrison | Mar. 28, 1893 |
| 587,301 | Demarest | Aug. 3, 1897 |
| 791,151 | King et al. | May 30, 1905 |
| 1,725,952 | Beebe | Aug. 27, 1929 |
| 1,756,106 | Svenson | Apr. 29, 1930 |
| 1,873,433 | Larsen | Aug. 23, 1932 |
| 2,003,599 | LeTourneau | July 4, 1935 |
| 2,068,397 | Chapman | Jan. 19, 1937 |
| 2,233,237 | Anderson et al. | Feb. 25, 1941 |
| 2,259,966 | Tappe | Oct. 21, 1941 |
| 2,362,220 | Shoemaker | Nov. 7, 1944 |
| 2,378,254 | Swaney | June 12, 1945 |
| 2,387,087 | Nelson | Oct. 16, 1945 |